Nov. 9, 1937.  W. G. HARDING  2,098,580
ANGULAR MOTION INDICATOR
Filed May 5, 1934
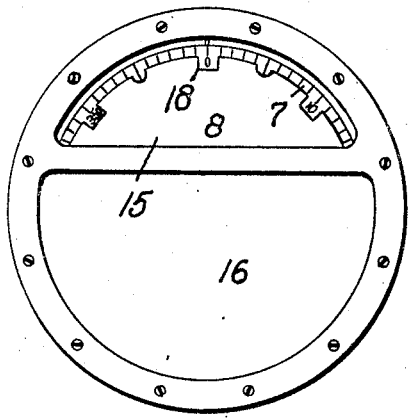
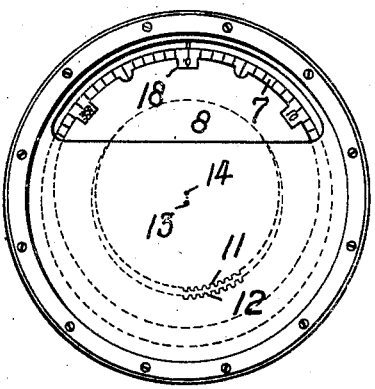
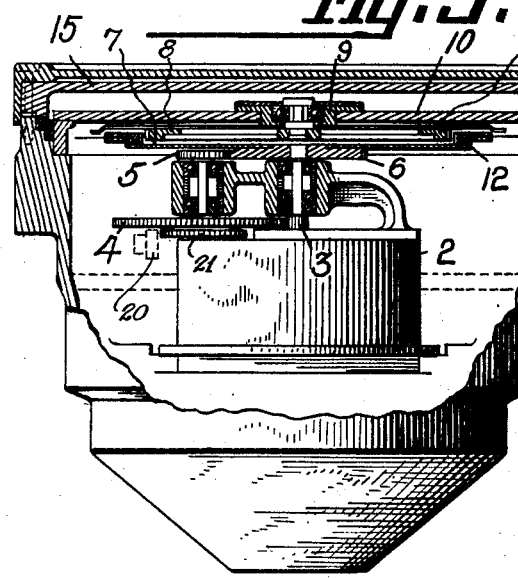
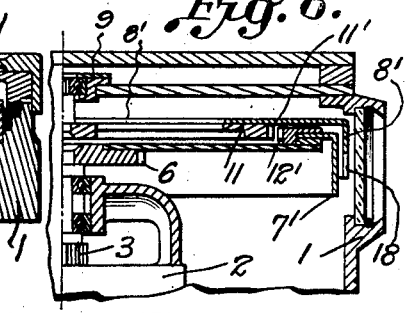
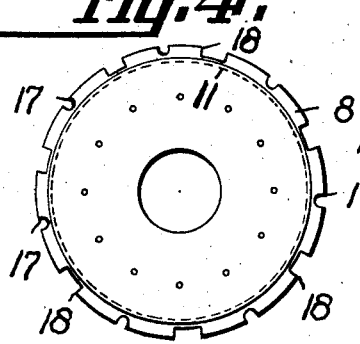
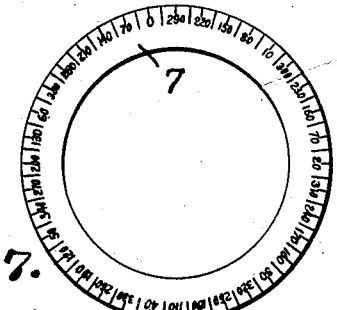
INVENTOR
WILLIAM G. HARDING
BY
HIS ATTORNEY Patented Nov. 9, 1937

2,098,580

UNITED STATES PATENT OFFICE 2,098,580

ANGULAR MOTION INDICATOR

William George Harding, North Acton, London, England, assignor to Sperry Gyroscope Company, Inc., Brooklyn, N. Y., a company of New York Application May 5, 1934, Serial No. 724,073
In Great Britain May 8, 1933

10 Claims. (Cl. 116—129)

This invention relates to angular motion indicators, such as the dials of ships' compasses, repeater compasses, radio tuning instruments, electrical and other measuring instruments, and the like, and has particular reference to dial means for magnifying the motions of the dial or compass card of a repeater compass or other repeating device actuated by remote control from a master compass or master transmitter.

According to my invention the dial means for indicating angular motion comprises two adjacent members adapted to be rotated through angular distances each at all times proportional to the angular motion to be indicated but different from each other, one of said members carrying indications such as numerals adapted to be viewed through apertures formed in the other of said members. The said adjacent members may conveniently consist of a pair of superposed dials or cards, the upper card being apertured to enable figures on the lower card to be viewed therethrough; alternatively the members may be in the form of annular or "drum" dials of different diameter the one being situated within the other, the inner dial carrying figures adapted to be viewed through apertures in the outer dial, or vice versa.

In order that the invention, and the manner in which it may be performed, shall be more fully understood, one embodiment thereof will now be described by way of example with reference to the accompanying drawing in which:—

Figure 1 is a plan view of a compass repeater dial means in accordance with the invention;

Figure 2 is a similar view to Figure 1, showing one form of gearing between the two dial cards;

Figure 3 is a side elevational view, partly in section, of a compass repeater embodying the invention;

Figures 4 and 5 are plan views of the upper and lower cards respectively of the instrument shown in Figure 3.

Fig. 6 is a vertical section, partly in elevation, of a modified form of compass repeater embodied in my invention.

Fig. 7 is a side view of the compass cards as they appear through the front window in this form of the invention.

In the drawing, 1 is the casing of a repeater compass connected electrically with a master compass not shown; in the said casing 1 is mounted a repeater motor of known type generally indicated by reference numeral 2 connected, through toothed gear wheels 3, 4, 5, with an externally toothed ring 6 mounted on the under side of an indicating card 7. The gearing and the speed of the repeater motor 2 are so proportioned that the card 7 is caused to move through an angular distance equal to a multiple of the distance through which the compass apparently turns. In the embodiment shown, the card 7 turns through five times the angular movement of the master compass. Thus, if the master compass card moves through an angle of 60° the indicating card 7 of the repeater will move through an angle of 300°. Immediately above the card 7 is mounted a second card, or mask 8, pivoted in a bearing 9 carried on a cross-member 10 of the repeater compass; the mask 8 is provided on its lower surface with an externally toothed ring 11, which engages with internal teeth formed on a ring 12 attached to the upper surface of card 7; the card 7 and mask 8 are pivoted at points 13, 14, respectively as indicated in Figure 2 in which is clearly shown the manner in which the teeth on rings 11 and 12 engage. It will be understood that with this arrangement rotation of card 7 will cause a proportional rotation of mask 8 at a slightly higher speed and in the same direction, due to the geared relationship of rings 11 and 12; i. e., the inner gear 11 has less teeth than the outer driving gear 12. The edge of the indicating card 7 is, as shown in Figure 5, divided by markings, into equal divisions numbered in a special manner. The mask 8 is, as shown in Figure 4, formed with notches or apertures 18, cut in its edge, of such size as, when the mask 8 is placed above card 7, to enable certain figures on the card to be seen, as clearly shown in Figures 1 and 2. As the card and mask rotate at different rates the apertures will pass slowly from one figure to another, but owing to the eccentric mounting of the card and mask (the card being centred at 13 and the mask at 14), the numbers on the cards and the spaces on the mask will travel substantially together for an arc of about one-third of a circle, at the top of the repeater as shown in Figure 2. Over the remaining two-thirds of the circle the numbers will be displaced more or less from the gaps in the mask, and to avoid confusion the lower portion of the card and mask are screened by a member 16. The repeater is provided with the usual glass cover-plate 15 (Figure 3).

As shown in Figure 4, mask 8 is provided with seven principal equally spaced apertures 18; additional smaller apertures 17 may, if desired, be also provided, as shown. As shown in Figure 5, card 7 is marked around its edge into 36 main divisions, which actually each subtend an angle of 10 degrees at the centre of the card, but are marked in the following manner: The division at the top of Figure 1 is marked "0", the next division anti-clockwise is marked "70", the next "140", and so on in increments of 70; when "350" is reached, the next division thereafter is marked "60", so that when the scale is fully marked, as shown in Figure 5, the numbers thereon, going clockwise, follow the sequence, 0, 290, 220, 150, 80, 10, 300, 230, etc. With this sequence, every fifth division, going clockwise for five consecutive circuits of the card, will give a reading in the following sequence: 0(360), 10, 20, 30, 40 ... to 340, 350, 360(0).

The card 7 moves, as stated above, at five times the rate at which the master compass card moves, and the gear ratio between the teeth on rings 11, 12, is such that the mask 8 makes 36 revolutions for every 35 revolutions of card 7. With the markings shown in Figure 5, and the relative angular speeds mentioned above, the mask 8 moves so that the markings clearly visible through the apertures 18 always correspond with the indication given by the master compass. For hand setting, a slidable crown gear 20 on a knob (not shown) may be provided, which is adapted to be pushed into mesh with gear 21 connected to gear 4.

The following example of a compass repeater will serve to make this clear. With the repeater dial in the position shown in Figure 1, the master compass dial shows that the ship is on a true north course. Suppose that a change of course is now made of 60°, and that the master compass dial indicates this change and transmits accordingly to the repeater. This will cause the repeater card 7 to move through an angle five times as great, namely 300°, and, as may be seen from Figure 5 the numeral 60 on card 7 will then be at the top of the repeater against the lubber line. At the same time the mask 8 will move through an angle of (36/35) × (300°), or, since 300° is five-sixths of a circle, the mask will move through (36/35) × (5/6) of a circle. That is to say, the mask will make six-sevenths of a complete turn. Each one-seventh of a turn brings a new gap to the top of the repeater, and consequently the numeral 60 will be at the top of the repeater and showing centrally through one of the gaps or apertures. If the ship should change course 360°, in which case the master compass appears to have turned through a complete turn, then the repeater card 7 will turn through five times this angle, or 1800 true degrees, equivalent to five whole turns. At the same time, the mask 8 will have moved 5 × (36/35) of a turn, i. e. five and one-seventh turns, which will bring it back into its original position at one-seventh of a turn, i. e. one aperture ahead.

Whilst an embodiment has been shown in which the mask 8 and card 7 are plane members pivoted one above the other, it is to be understood that in one alternative construction, the mask 8' and the other member 7' may take the form of annular dials or drums (Figs. 6 and 7), mounted with their axes either vertical or horizontal, and relatively rotatable the one within the other. In this case the gearing connecting the two annular dials may comprise toothing 11' on one dial meshing with toothing 12' on the other dial, as before, and the dials may also be pivoted eccentrically the one with regard to the other.

It is to be observed that all the divisions and figures necessary to operation of the device are permanently engraved in fixed relation to one another on a single card, and that with the present invention no separate indicators carrying figures require to be automatically changed, as has been necessary in a construction previously proposed.

Although in the embodiment above described I have described an arrangement for a repeater compass in relation to a master compass, it will be understood that my invention is equally applicable to repeating instruments of any kind, using centesimal, radian, or other systems of sub-division of the circle, and with any convenient speed ratio. Further, my invention is not limited to dials operated from a distance but may be applied to any radio tuning instruments, electrical and other measuring instruments, and the like in which angular motion is to be indicated in a magnified degree.

What I claim is:—

1. An indicator for indicating angular motion comprising two adjacent members, means for revolving said members through distances each at all times proportional to the angular motion to be indicated but different from each other, portions of one of said members having apertures therein, and indications such as numerals on the other member adapted to be viewed through said apertures.

2. An indicator for indicating angular motion comprising two adjacent circular dials, means for rotating said dials through angular distances each at all times proportional to the angular motion to be indicated but different from each other, portions of one of said dials having apertures therein, and indications such as numerals on the other dial adapted to be viewed through said apertures.

3. An indicator for indicating angular motion comprising two adjacent members, gearing connecting said members, means for revolving said members in unison through distances each at all times proportional to the angular motion to be indicated but slightly different from each other, portions of one of said members having apertures therein, and indications such as numerals on the other member adapted to be viewed through said apertures.

4. An indicator for indicating angular motion comprising two adjacent dials pivoted eccentrically the one with regard to the other, an internally toothed ring on one dial, an externally toothed ring on the other dial and meshing with said internally toothed ring, means for rotating said members through angular distances each at all times proportional to the angular motion to be indicated, portions of one of said dials forming apertures, and indications such as numerals on the other dial adapted to be viewed through said apertures.

5. An indicator for indicating angular motion comprising two superposed members, means covering a portion of the surface of said members so that only a segmental portion thereof is visible, means for revolving said members through distances each at all times proportional to the angular motion to be indicated but different from each other, portions of one of said members forming apertures therein, and indications such as numerals on the other member adapted to be viewed through said apertures.

6. An indicator for indicating angular motion comprising two annular or drum dials, one situated substantially within the other, means for rotating said dials through angular distances each at all times proportional to the angular motion to be indicated but different from each other, portions of one of said dials forming apertures therein, and indications such as numerals on the other dial adapted to be viewed through said apertures.

7. An indicator for indicating angular motion comprising two annular or drum dials, one situated substantially within the other, gearing connecting said dials, means for rotating said dials through angular distances each at all times proportional to the angular motion to be indicated but different from each other, portions of one of said dials forming apertures therein, and indications such as numerals on the other dial adapted to be viewed through said apertures.

8. In a repeater compass for ships, a repeater motor, a part revolved therefrom a plurality of times for each complete turn of the ship and having graduations and a plurality of series of figures thereon, and a second part also revolved from said motor at a differential speed, said second part functioning as a mask to expose said figures only in their correct sequence.

9. In a repeater compass for ships, two adjacent indicating members, means for revolving one of said members a plurality of times for each complete turn of the ship, means for revolving the other member at a slightly different rate, one of said members having a plurality of series of figures thereon equal to the times said first member revolves for each ship's turn, and the other member acting as a mask and having spaced apertures therein through which at least a portion of only one series of figures is visible at any one time.

10. In a repeater compass for ships, a repeater motor, a part revolved therefrom an integral number of times for each complete turn of the ship and having a single row of graduations and a number of series of figures thereon, the figures of the series being interspersed and arranged in a single row adjacent said graduations and the number of said series being equal to said integral number, and a second part also revolved from said motor at a differential speed, said second part functioning as a mask to expose said figures only in their correct sequence.

WILLIAM GEORGE HARDING.